May 19, 1942.　　　R. A. SANDBERG　　　2,283,464
AUTOMOBILE BUMPER GUARD
Filed April 5, 1941
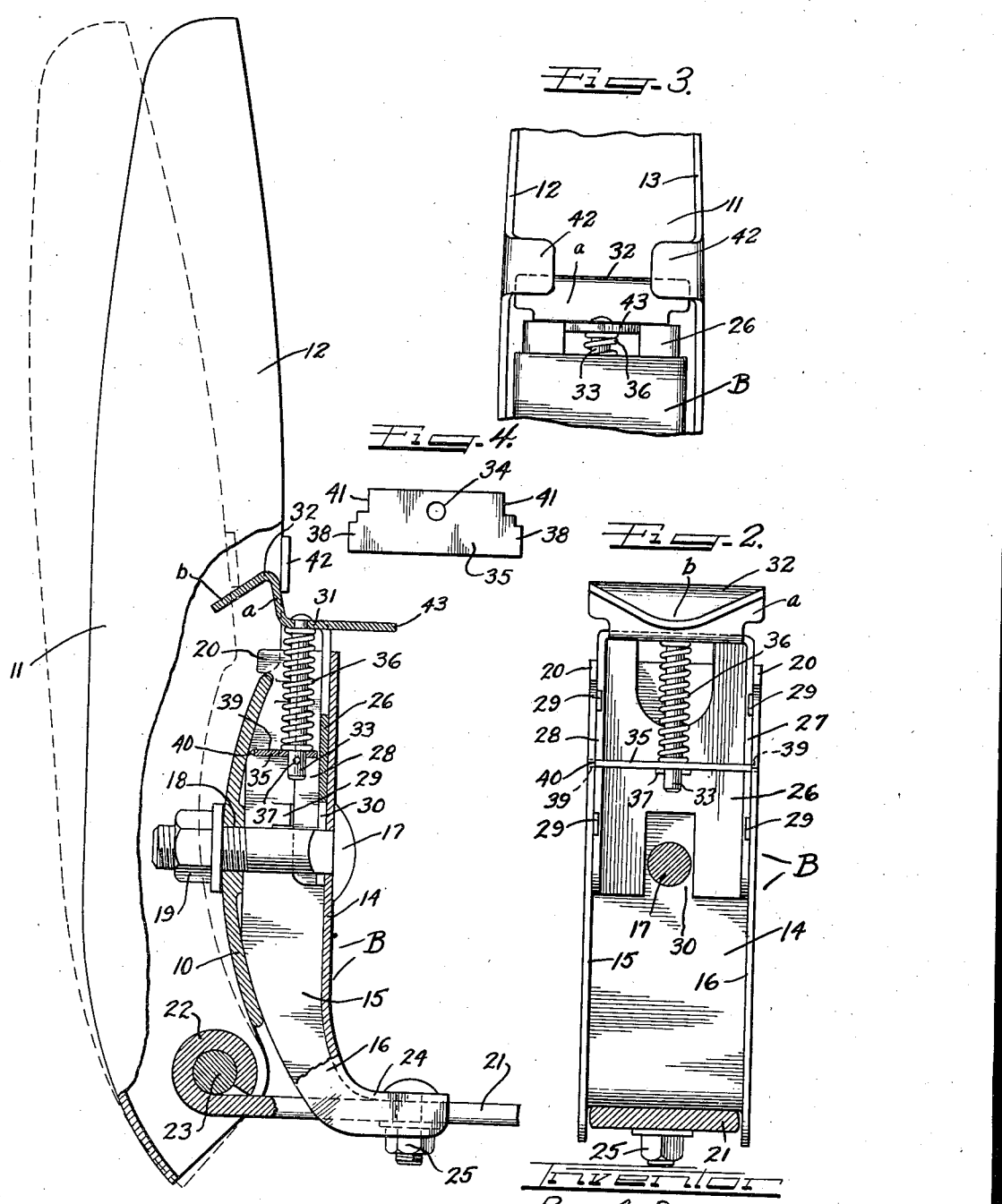

Patented May 19, 1942

2,283,464

UNITED STATES PATENT OFFICE 2,283,464

AUTOMOBILE BUMPER GUARD

Ray A. Sandberg, Waukegan, Ill., assignor to Houdaille-Hershey Corporation, Detroit, Mich., a corporation of Michigan Application April 5, 1941, Serial No. 387,009

2 Claims. (Cl. 293—55)

This invention relates to vertical guards for automobile bumper bars, particularly to the hinge type of guard which may be swung down to permit access to some automobile parts as for example the upwardly swinging door or cover of the trunk or baggage compartment at the rear of the automobile body.

The important object of the invention is to produce a simple economically manufactured guard structure of this type in which the latching mechanism for holding the guard in service position comprises a minimum number of simple parts readily manipulated for release of the guard body for downward swing.

Another important object is to provide improved structure forming a hinge support for the guard body and also functioning to protect the guard structure and bumper impact bar against torsional strain and distortion when the guard structure is impacted by the bumper on another vehicle.

The various features of my invention are incorporated in the structure shown on the drawing, in which:

Figure 1 is a side elevation, partly in section, of the guard structure mounted on a bumper impact bar;

Figure 2 is a front elevation of the supporting bracket structure for the swingable guard body and the latching mechanism;

Figure 3 is a rear elevation to show the latching cooperation of the guard body with the latch mechanism; and Figure 4 is a plan view of a guide plate for the latch mechanism.

Referring to Figure 1, 10 represents the front impact bar of a bumper structure to which my improved guard structure is applied. This guard structure comprises the guard body or impact member 11 of channel shape having the sidewalls 12 and 13 shaped at their rear edges to engage against and follow the front transverse curvature of the impact bar 10.

A supporting bracket structure B is of U-shaped cross section comprising the back wall 14 and the sidewalls or flanges 15—16. At their front edges the sidewalls are shaped to fit against and follow the curvature of the inner side of the bumper impact bar 10, and a bolt 17 extends through the back wall 14 of the bracket and through an opening 18 in the impact bar 10 to receive a nut 19 whereby the bracket is rigidly secured to the impact bar. At their upper ends the sidewalls 15 and 16 of the bracket have projecting tongues 20 engaging against the upper edge of the impact bar to assist in holding the bracket accurately aligned on the bar.

Suitably secured to and extending from the vehicle chassis or body is a bar 21 bent at its end to form a hinge sleeve 22 for receiving the hinge pin 23 extending between and secured to the sidewalls 12 and 13 of the guard body 11. The guard body may thus be swung upwardly on its hinge support to the service position against the front of the bumper impact bar 10, or may be swung downwardly out of the way of an automobile part, such as the trunk door, so that the door may be swung open.

The bracket structure B has its lower end portion 24 deflected rearwardly to receive the supporting bar 21 and to be rigidly secured thereto as by a bolt 25. With the bracket rigidly secured to the supporting bar and to the bumper impact bar 10, the hinge support for the guard body will be rigidly held in proper relation to the impact bar so that the guard body may always accurately engage with the impact bar when set to its service position, and furthermore the bumper impact bar will be strengthened against torsional distortion when the upper part of the guard body is struck by the bumper of another vehicle.

The latch mechanism for the guard body 11 is supported on the bracket B. It comprises a vertical guide part of U-shaped cross section having the back wall 26 engaging against the back wall 14 of the bracket, and the sidewalls or flanges 27 and 28 engaging against the sidewalls 14 and 15 respectively of the bracket. Tongues 29 deflected out of the sidewalls of the bracket form guides in front of the sidewalls 27 and 28 of the guide frame 26 so that this frame is guided for vertical reciprocation in the bracket B. At its lower end the frame wall 26 is cut out as indicated at 30 to receive and clear the bolt 17.

At its upper end the wall 26 is deflected forwardly to form a top wall 31 whose forward end is bent and shaped to provide a latch hook 32. Secured to and depending from the top wall 31 is a rod 33 which extends through a passageway 34 in the guide plate 35 extending between the sidewalls 14 and 15 of the bracket B. A spring 36 encircles the rod between the wall 31 and the plate 35 and tends at all times to shift the latching frame 26 upwardly to its latching position, a pin 37 extending through the rod below the plate 35 limiting such upward shift of the frame.

To support the guide plate 35, its ends 38 extend into transverse slots 39 in the bracket sidewalls 15 and 16, and after insertion of the plate, the metal at the ends of the slots is upset to close the slots, as indicated at 40. At its inner end, the plate 35 is recessed as indicated at 41 for clearing the sidewalls 27 and 28 of the frame 26 so as not to interfere with the free vertical reciprocation of this frame.

Extending transversely inwardly from the sidewalls 12 and 13 of the guard body 11 are keeper tongues 42 for cooperation with the latch hook 32. When the guard body is in its service position, as shown in full lines on Figure 1, these keeper tongues will be behind the back wall $a$ of the latch hook, and this back wall has a comparatively slight inclination forwardly from the horizontal top wall 31 of the frame 26 so that, as the spring 36 urges the frame 26 upwardly, this inclined back wall will exert camming action against the keeper tongues 42 tending to force the guard body 11 intimately against the front of the impact bar 10 and to hold it in such service position against loose motion or rattling. When it is desired to swing the guard body down for access to the trunk door of the automobile, the frame 26 may be pressed down manually to withdraw the latch hook from the keeper tongues. To facilitate such manual operation of the frame 26, a portion 43 is deflected therefrom into horizontal position to form a finger plate by which the frame 26 may be readily depressed.

When the swung down guard body is swung back toward its service position, the tongues 42 will engage with the inclined front leg $b$ of the latch hook 32, the inclination of this leg being such that the keeper tongues will cam the hook and frame 26 downwardly until the keeper tongues have passed the crest of the hook and then the spring 36 will shift the hook upwardly for camming engagement with the keeper tongues to cam the guard body into its service position.

If desired, the inclination of the back $a$ of the latch hook may be such that when abnormal pull is applied to the upper end of the guard body 11 in a direction away from the bumper impact bar 10, the keeper tongues will cam the latch hook supporting frame 26 downwardly for release of the guard body. Should the bumper of another vehicle succeed in passing over the top and behind the guard body 11, then when such vehicle drives away, the guard body will be swung away from the latch mechanism and the guard structure and the impact bar will not be injured.

I have thus produced a simple, economically manufactured, but very efficient guard structure for automobile bumpers in which a minimum number of simple parts, readily formed from sheet metal, function to latch the guard body in service position and can be readily manipulated to release the guard body for downward swing.

I have shown a practical and efficient embodiment of the features of my invention but I do not desire to be limited to the exact construction, arrangement and operation shown and described as changes and modifications may be made without departing from the scope of the invention.

I claim as follows:

1. Guard structure for an automobile bumper comprising a bracket of U-shaped cross section adapted to be secured against the rear side of an automobile bumper impact bar to extend transversely thereof, a guard body having hinge connection at its lower end with the lower end of said bracket for swing into or out of service position relative to an impact bar, a latch frame of U-shape cross section seated within said bracket for vertical shift therein, tongues deflected out of the sidewalls of said bracket to be in front of the sidewalls of said latch frame for cooperating with the rear wall of said bracket to guide said latch frame, a latch hook at the outer end of said latch frame, the sidewalls of said bracket having slots, a guide plate seated at its ends in said slots to extend transversely in said bracket, a rod extending from the upper end of said latch frame through said guide plate, a spring interposed between said guide plate and the outer end of said latch frame for urging said latch frame outwardly for setting of the latch hook in latching position, and keeper structure on said guard body for interlatching engagement with said latch hook when said body is swung upwardly into its service position.

2. Guard structure for an automobile bumper comprising a bracket of U-shape cross section adapted to be secured against the rear side of an automobile bumper impact bar to extend transversely thereof, a guard body of U-shape cross section having hinge connection at its lower end with the lower end of said bracket for swing into or out of service position relative to an impact bar, a latch frame within said bracket to extend the full width thereof, means on said bracket for guiding said latch frame for vertical shift, a latch plate at the outer end of said latch frame and integral therewith and terminating at its forward end in a latch hook, an abutment plate within said bracket extending between the sidewalls thereof, a spring between said abutment plate and said latch plate tending to shift said latch frame outwardly, and keeper tongues extending from the opposite sidewalls of said guard body for interlatching engagement with the lateral ends of said latch hook when said guard body is swung upwardly into service position.

RAY A. SANDBERG.